(12) United States Patent
Dong (10) Patent No.: US 12,200,543 B2
(45) Date of Patent: Jan. 14, 2025

(54) DATA TRANSMISSION METHOD AND APPARATUS, AND COMMUNICATION DEVICE

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 342 days.

(21) Appl. No.: 17/773,815

(22) PCT Filed: Nov. 4, 2019

(86) PCT No.: PCT/CN2019/115387
§ 371 (c)(1),
(2) Date: May 2, 2022

(87) PCT Pub. No.: WO2021/087674
PCT Pub. Date: May 14, 2021

(65) Prior Publication Data
US 2022/0400406 A1  Dec. 15, 2022

(51) Int. Cl.
*H04W 28/08* (2023.01)
*H04L 47/24* (2022.01)
(Continued)

(52) U.S. Cl.
CPC ..... *H04W 28/082* (2023.05); *H04W 28/0967* (2020.05)

(58) Field of Classification Search
CPC ........... H04W 28/082; H04W 28/0967; H04W 76/15; H04W 84/12; H04W 28/0875;
(Continued)

(56) References Cited

U.S. PATENT DOCUMENTS 7,394,794 B2 * 7/2008 Turki ................... H04W 74/06
709/227
7,636,368 B2 * 12/2009 Jang ..................... H04L 49/9042
370/535

(Continued)

FOREIGN PATENT DOCUMENTS

WO   WO 2007018697 A1   2/2007
WO   WO 2020034599 A1   2/2020

OTHER PUBLICATIONS

Indian Patent Application No. 202247031962, Office Action dated Sep. 22, 2022, 5 pages.
(Continued)

*Primary Examiner* — Ahmed Elallam
(74) *Attorney, Agent, or Firm* — Cozen O'Connor (57) ABSTRACT

A method for transmitting data includes generating a plurality of first data frames based on the same type of data content, wherein the plurality of first data frames have the same traffic identifier (TID), and the plurality of first data frames having the same TID have the same access media priority in a plurality of transmission links; and transmitting the plurality of first data frames having the same TID using the plurality of transmission links. An apparatus for performing the method may include a terminal in a wireless communication network.

20 Claims, 5 Drawing Sheets

(51) Int. Cl.
*H04W 28/02* (2009.01)
*H04W 28/082* (2023.01)

(58) Field of Classification Search
CPC .. H04W 28/0268; H04W 28/06; H04L 45/24; H04L 47/24; H04L 47/2483
See application file for complete search history.

(56) References Cited

U.S. PATENT DOCUMENTS

| | | | | |
|---|---|---|---|---|
| 7,983,234 | B2* | 7/2011 | Taki | H04L 1/1614 370/338 |
| 9,985,749 | B2* | 5/2018 | Dayanandan | H04L 1/1887 |
| 10,128,989 | B2 | 11/2018 | Ghosh et al. | |
| 10,856,203 | B2* | 12/2020 | Zhou | H04B 1/1615 |
| 10,911,190 | B2* | 2/2021 | Li | H04L 27/2602 |
| 11,923,926 | B2* | 3/2024 | Adachi | H04W 84/12 |
| 2008/0095127 | A1 | 4/2008 | Taki | |
| 2018/0176929 | A1 | 6/2018 | Ryu et al. | |
| 2018/0206174 | A1 | 7/2018 | Zhou et al. | |
| 2019/0082373 | A1 | 3/2019 | Patil et al. | |
| 2019/0239193 | A1 | 8/2019 | Rudolf et al. | |
| 2019/0335454 | A1 | 10/2019 | Huang et al. | |
| 2021/0329721 | A1* | 10/2021 | Kim | H04W 76/15 |

OTHER PUBLICATIONS

Japanese Patent Application No. 2022-524714, Office Action dated May 12, 2023, 4 pages.
Japanese Patent Application No. 2022-524714, English translation of Office Action dated May 12, 2023, 4 pages.
European Patent Application No. 19951436.5, Search and Opinion dated Jun. 15, 2023, 10 pages.
Russian Patent Application No. 2022115116, Office Action dated Feb. 3, 2023, 7 pages.
Russian Patent Application No. 2022115116, English translation of Office Action dated Feb. 3, 2023, 5 pages.

* cited by examiner

FIG. 1

Octets:

| 2 | 2 | 6 | 0 or 6 | 0 or 6 | 0 or 2 | 0 or 6 | 0 or 2 | 0 or 4 | variable | 4 |
|---|---|---|--------|--------|--------|--------|--------|--------|----------|---|
| Frame Control | Duration/ ID | Address 1 | Address 2 | Address 3 | Sequence Control | Address 4 | QoS Control | HT Control | Frame Body | FCS |

| B1 | B15 B16 | B17 B18 | B19 B20 B21 | B22 B23 | B24 | B25 B28 | B29 |
|---|---|---|---|---|---|---|---|
| Link Adaptation Control | Calibration Position | Calibration Sequence | Reserved | CSI/Steering | HT NDP Announcement | Reserved | DEI |
| Bits 15 | 2 | 2 | 2 | 2 | 1 | 4 | 1 |

DATA TRANSMISSION METHOD AND APPARATUS, AND COMMUNICATION DEVICE

CROSS-REFERENCE TO RELATED APPLICATION

This application is the US national phase application of International Application No. PCT/CN2019/115387, filed on Nov. 4, 2019, the entire contents of which are incorporated herein by reference.

TECHNICAL FIELD

The disclosure relates to but not limited to the technical field of wireless communication, and in particular to a method for transmitting data, an apparatus for transmitting data and a communication device.

BACKGROUND

The Institute of Electrical and Electronics Engineers constituted a study group (SG) to study next-generation mainstream Wi-Fi technologies. The research scope is: Wi-Fi transmission with a bandwidth of 320 MHz, aggregation and coordination technology using multiple frequency bands. The speed and throughput proposed in the vision has been increased to at least four times compared to that of the existing IEEE802.11ax. The main application scenarios of the new technology are video transmission, augmented reality (AR), and virtual reality (VR). The aggregation and coordination technology of multiple frequency bands refers to simultaneous communication among Wi-Fi devices in different frequency bands such as 2.4 GHz, 5.8 GHz, and 6-7GH, or in different bandwidths under the same frequency band.

SUMMARY

In this view, embodiments of the disclosure provide a method for transmitting data, an apparatus for transmitting data, a first communication terminal and a second communication terminal.

Embodiments of a first aspect of the disclosure provide a method for transmitting data, applied to a first communication terminal. The method includes:
  generating a plurality of first data frames based on a same type of data content, in which the plurality of first data frames have a same traffic identifier (TID), and the plurality of first data frames having the same TID have a same access media priority in a plurality of transmission links; and
  transmitting the plurality of first data frames having the same TID using the plurality of transmission links.

Embodiments of a second aspect of the disclosure provide a method for transmitting data, applied to a second communication terminal. The method includes:
  receiving a plurality of first data frames having a same TID transmitted by a first communication terminal using a plurality of transmission links, in which the plurality of first data frames are generated based on a same type of data content, and the plurality of first data frames having the same TID have a same access media priority in each transmission link.

Embodiments of a third aspect of the disclosure provide a first communication terminal. The first communication terminal includes a processor, a memory and executable programs stored in the memory and capable of being run by the processor. When the processor runs the executable programs, the method for transmitting data according to the first aspect is implemented.

Embodiments of a fourth aspect of the disclosure provide a second communication terminal. The second communication terminal includes a processor, a memory and executable programs stored in the memory and capable of being run by the processor. When the processor runs the executable programs, the method for transmitting data according to the second aspect is implemented.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a", "said" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in this disclosure to describe various information, the information should not be limited to these terms. These terms are only used to distinguish the same type of information from each other. For example, without departing from the scope of the disclosure, the instruction information may also be referred to as the second information, and similarly, the second information may also be referred to as the instruction information. Depending on the context, the word "if" as used herein can be interpreted as "when", "while" or "in response to determining".

The executive bodies involved in the embodiments of the disclosure include but not limited to: wireless communication networks, especially Wi-Fi networks, such as networks under the IEEE802.11a/b/g/n/ac standard, and network devices under the IEEE802.11be standard in the next generation Wi-Fi network. The network devices include but not limited to: Wi-Fi routers and other wireless access point (AP) devices, wireless stations (STA), user terminals, user nodes, mobile terminals or tablet computers.

An application scenario of the embodiments of the disclosure is that, in order to ensure QoS of data frame transmission, different access medium priorities need to be defined for data frames based on different upper layer data. For aggregative and collaborative data communication of different frequency bands, there is no existing way of defining data frames having different access medium priorities.

Figure 1:
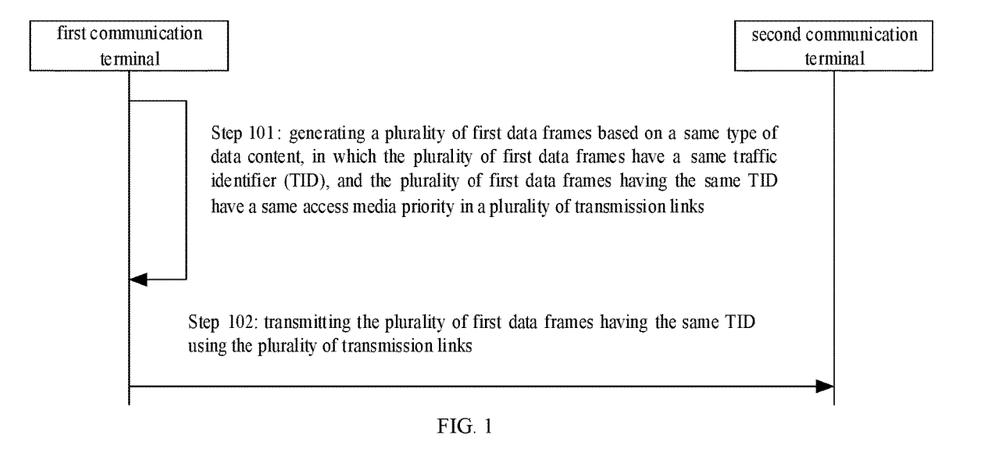
FIG. 1 is a flowchart of a method for transmitting data according to an exemplary embodiment.

As illustrated in FIG. 1, this exemplary embodiment provides a method for transmitting data, and the method for transmitting data can be applied to a first communication terminal of wireless communication, including the following steps.

In step 101, a plurality of first data frames are generated based on a same type of data content, in which the plurality of first data frames have a same traffic identifier (TID), and the plurality of first data frames having the same TID have a same access media priority in a plurality of transmission links.

In step 102, the plurality of first data frames having the same TID are transmitted by the plurality of transmission links.

Here, wireless communication may be Wi-Fi communication under the IEEE802.11be standard. The first communication terminal and a second communication terminal may be a wireless STA and a wireless AP in the Wi-Fi communication. The first data frames may be data frames respectively transmitted by the plurality of transmission links. The first data frame may be a media access control protocol data unit (MPDU) or an aggregation media access control protocol data unit (A-MPDU).

Here, each transmission link occupies one transmission band, and multiple transmission links occupy multiple transmission bands. The transmission band may be any Wi-Fi working band, such as 2.4 GHz, 5.8 GHz and 6-7 GHz, or may be a frequency range of a bandwidth occupied by the transmission band. The frequency ranges of the bandwidths occupied by respective transmission bands may belong to the same Wi-Fi working band, or may belong to different Wi-Fi working bands. There may be multiple first data frames, and the multiple first data frames may be transmitted in multiple transmission links respectively. The multiple first data frames may include two or more data frames.

The first communication terminal such as STA encapsulates data content of the upper layer into a data frame according to a certain frame structure at the MAC layer, and then sends the data frame through a port physical layer (PHY) after being processed by a physical layer convergence protocol (PLCP) sublayer.

Here, the same type of data content may be data content having the same type. For example, data content with high real-time transmission requirement can be classified into one type, and data content with high reliability requirement can be classified into one type. The same TID may be set for the first data frames generated based on the data content of the same type.

The type corresponding to the data content may include: speech data, video data or other data types. Other data types may include, but not limited to, ultra reliable & low latency communication (URLLC) service data.

Data content Wi-Fi multimedia defines multiple access media priority queues for data frames of different data content types of upper-layer data. The access media priority may include: speech priority, video priority, best effort priority, and back ground priority. Different data content types have different access media priorities. The access media priority of the data content with high real-time transmission requirement may be the speech priority, and the access media priority of the data content with a large data amount may be the video priority, the access media priority of the data content with high reliability requirement may be the best effort priority, and the access media priority of the data content with ordinary transmission requirement may be the back ground priority. The data frames are transmitted in a queue according to the access media priorities of the data frames. For example, the data frames having the high access media priority are transmitted first.

Here, when the upper layer data is encapsulated into a data frame at the MAC layer, a TID can be set in the data frame. Data frames of the same data content type can be set with the same TID, and data frames of different data content types have different TIDs. Different TIDs can be configured to represent different access media priorities. Therefore, data frames of the same data content type have the same access media priority.

TID may be set at a preset position of a MAC frame header, for example, TID may be set at a reserved bit of the MAC frame header. TID can occupy 3 bits, and different values are configured to represent different TIDs, and to further represent different access media priorities.

When the first communication terminal transmits the first data frames, it may read the TIDs of the first data frames first, and then determine the access media priorities of the first data frames. The first data frames may be placed into an access media priority transmission queue for transmission. The first communication terminal may transmit the data frames according to the corresponding access media priorities of respective transmission queues from high to low.

The first data frames may be transmitted by the first communication terminal through multiple transmission links and received by the second communication terminal. The second communication terminal may be a STA or an AP in Wi-Fi communication. The frequency band coverage ranges of multiple transmission links are different, and the multiple transmission links can transmit data frames at the same time, thereby increasing a transmission rate of data frames and improving a transmission efficiency of data frames.

In this way, the first data frames based on the same type of data content have the same TID, and further, when the first data frames based on the same type of data content are transmitted in multiple transmission links, the first data frames have the same access media priority. Therefore, when each transmission link transmits the first data frames of the same access media priority, the expected QoS can be satisfied, and actual QoS instability for different types of data content is reduced. Moreover, the transmission efficiency is improved by using multiple transmission links.

In an embodiment, transmitting the plurality of first data frames having the same TID using the plurality of transmission links includes:

in response to a transmission link switching condition being satisfied, stopping transmitting the first data frame using a first transmission link in the pre-configured plurality of transmission links, and transmitting the first data frame using a second transmission link in the plurality of transmission links.

The frequency band of the first transmission link is different from the frequency band of the second transmission link.

Different transmission links have different traffic loads. When the first communication terminal transmits the first data frame through one transmission link in the multiple transmission links, if a traffic status of the transmission link no longer meets transmission requirements of the first data frame, the first data frame can be transferred to another transmission link in the plurality of transmission links for transmission. When the first data frame is transferred to another transmission link, the TID remains unchanged.

The transmission link switching condition may be set according to a traffic status of the first transmission link. For example, when the first transmission link is disturbed by external interference, the first data frame may be transferred from the first transmission link to the second transmission link for transmission.

The transmission link of the first data frame may be switched by a MAC multi-link logic entity (MAC MLLE), and the TID of the first data frame in the first transmission link may be maintained.

In this way, when the transmission link is switched for the first data frame, the transmission link after switching can be selected based on the access media priority, thereby reducing actual QoS instability of data content of the same type caused since the transmission link after switching does not have the access media priority of the first data frame.

In an embodiment, before transmitting the first data frame using the second transmission link in the plurality of transmission links, the method further includes:

transmitting a second data frame using the first transmission link.

The second data frame includes frequency band information configured to indicate a frequency band of the second transmission link.

Here, the second data frame is a data frame transmitted before the first data frame. The first data frame and the second data frame may be data frames generated based on the same type of data content. The second data frame carries the frequency band information, which is configured to instruct the second communication terminal to use the second transmission link to receive subsequent data frames after the second data frame. After receiving the second data frame carrying the frequency band information, the second communication terminal determines the frequency band of the second transmission link according to the frequency band information, and receives data frames transmitted after the second data frame using the second transmission link.

The frequency band information carried in the second data frame transmitted before the first data frame instructs the second communication terminal to switch to the second transmission link for receiving the data frame. In this way, the user device can be informed in advance that it needs to switch to the second transmission link for receiving the data frame, thereby reducing data frame reception failures caused when the user device does not switch to the second transmission link or does not switch to the second transmission link in time.

In an embodiment, the frequency band information is located at a first preset position in a QoS field of a MAC frame header of the second data frame.

Figure 2:
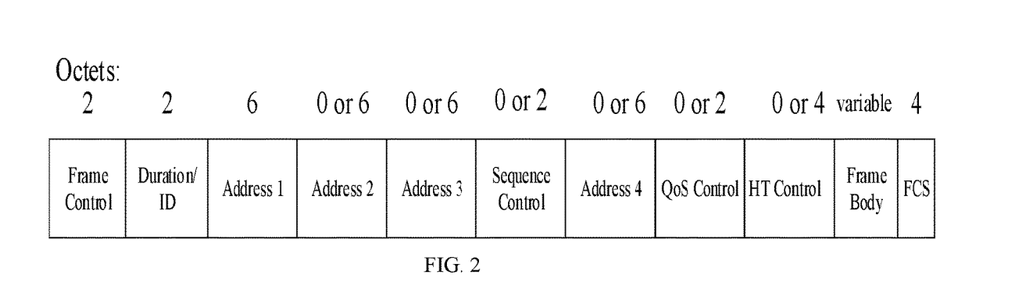
FIG. 2 is a schematic diagram of a media access control (MAC) frame structure according to an exemplary embodiment.

A preset position may be set in the QoS field of the MAC frame header of the MAC layer data frame shown in FIG. 2.

Figure 3:
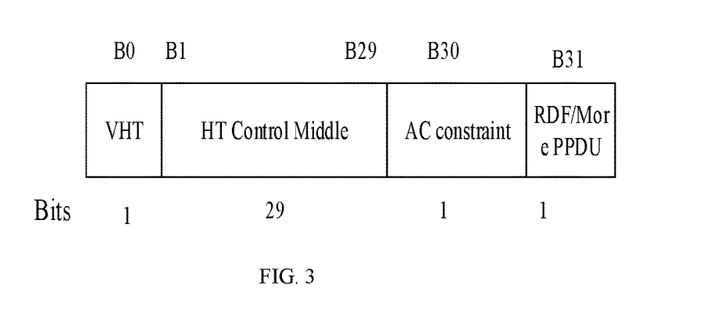
FIG. 3 is a schematic diagram of a high-throughput control field according to an exemplary embodiment.

As illustrated in FIG. 3, the frequency band information may be set in a high-throughput (HT) control middle subfield. VHT means: very high throughput, and AC means: access category.

Figure 4:
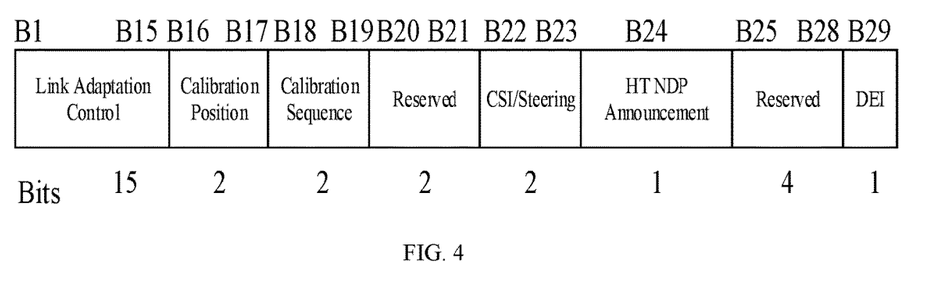
FIG. 4 is a schematic diagram of a high-throughput control middle subfield according to an exemplary embodiment.

For example, as illustrated in FIG. 4, the frequency band information can be set using reserved bits B25 to B284 in the HT control middle subfield. For example, two bits may be configured to identify the frequency band to be switched to, that is, the frequency information of the second transmission link. HT NDP means: high throughput null data packet.

In an embodiment, the transmission link switching condition includes one of:

a load of the first transmission link being greater than a load threshold; and a communication quality of the first transmission link being less than a quality threshold.

When the load of the first transmission link is greater than the load threshold, the first data frame may be switched to the second transmission link for transmission.

When the communication quality of the first transmission link is less than the quality threshold, the first data frame may also be switched to the second transmission link for transmission. The communication quality may include: a signal-to-noise ratio of the communication signal.

In an embodiment, before in response to the transmission link switching condition being satisfied, stopping transmitting the first data frame using the first transmission link in the pre-configured plurality of transmission links, and transmitting the first data frame using the second transmission link in the plurality of transmission links, the method further includes:

receiving a third data frame or a management frame transmitted by a second communication terminal, in which the third data frame or the management frame carries multi-transmission link switching capability information.

Moreover, in response to the transmission link switching condition being satisfied stopping transmitting the first data frame using the first transmission link in the pre-configured plurality of transmission links, and transmitting the first data frame using the second transmission link in the plurality of transmission links, includes:

in response to the multi-transmission link switching capability information indicating that the second communication terminal has a capability of switching the transmission link to transmit data frames, and in response to the transmission link switching condition being satisfied, stopping transmitting the first data frame using the first transmission link in the pre-configured plurality of transmission links and transmitting the first data frame using the second transmission link in the plurality of transmission links.

Before the first communication terminal and the second communication terminal perform data transmission using multiple transmission links, the first communication terminal and the second communication terminal can determine based on the multi-transmission link switching capability information carried in the management frame or the data frame whether the other party has the capability of switching the transmission link to transmit data frames. After it is determined that the other party has the capability of switching the transmission link to transmit data frames, multi-link transmission can be performed and/or switching the transmission link can be performed for transmitting data frames.

For example, when the first communication terminal determines based on the multi-transmission link switching capability information that the second communication terminal does not have the ability of switching the transmission link to transmit data frames, if the transmission link switching condition is satisfied, the first communication terminal still transmits the first data frame using the first transmission link. When the first communication terminal determines that the second communication terminal has the capability of switching the transmission link to transmit the data frames, the first data frame may be switched to the second transmission link for transmission.

In detail, STA can carry the multi-transmission link switching capability information in the management frame such as a probe request frame, an association request frame, or an authentication request frame. AP can carry the multi-transmission link switching capability information in the management frame such as a beacon frame, a probe response frame, an association response frame, or an authentication response frame.

In an embodiment, the first data frame further includes frame type identification information.

The frame type identification information is configured to indicate whether the first data frame is an aggregated data frame transmitted using the plurality of transmission links.

Here, the frame type identification information may be carried in the first data frame. After receiving the first data frame, the second communication terminal determines the type of the first data frame according to the frame type identification information. If the first data frame is an aggregated data frame transmitted using the plurality of transmission links, the first data frame and aggregated data frames transmitted by a plurality of other transmission links may be combined and decoded.

In an embodiment, the frame type identification information is located at a second preset position in the QoS field of the MAC frame header of the first data frame.

For example, as illustrated in FIG. 4, two bits (i.e., B20 and B21) in the HT control middle subfield can be configured to set the frame type identification information. The HT control middle subfield is located in the HT of the QoS field.

In an embodiment, the TID is located at a third preset position in the QoS field of the MAC frame header of the first data frame.

The TID may be set in the QoS field of the MAC layer data frame shown in FIG. 2. The QoS field is located at the MAC frame header position of the MAC layer data frame. The TID can occupy 3 bits.

In an embodiment, transmitting the plurality of first data frames having the same TID using the plurality of transmission links includes at least one of:

transmitting the plurality of first data frames having the same TID using independent multi-link aggregation transmission; and transmitting the plurality of first data frames having the same TID using simultaneous multi-link aggregation transmission.

Figure 6:
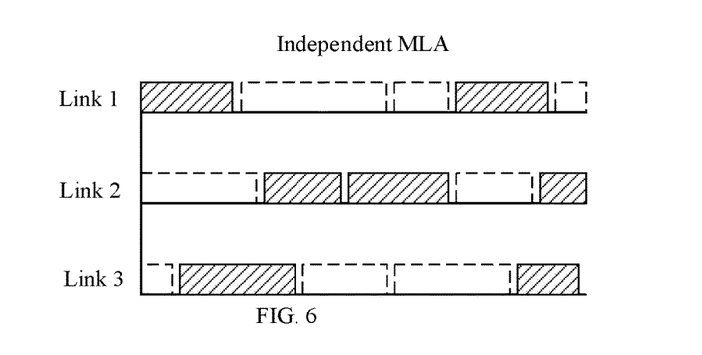
FIG. 6 is a schematic diagram of independent multi-link aggregation transmission according to an exemplary embodiment.
Figure 7:
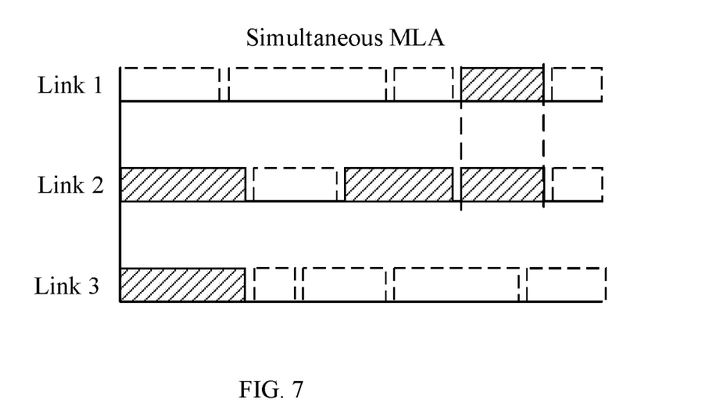
FIG. 7 is a schematic diagram of simultaneous multi-link aggregation transmission according to an exemplary embodiment.

The plurality of transmission links include: independent multi-link aggregation transmission shown in FIG. 6 and simultaneous multi-link aggregation transmission shown in FIG. 7.

As illustrated in FIG. 6, When the first data frames are transmitted using the independent multi-link aggregation transmission, the first data frames are transmitted independently by each transmission link, and the plurality of transmission links of the independent multi-link aggregation transmission can be determined according to their respective scheduling requirements in a time domain, without the need to maintain synchronization.

As illustrated in FIG. 7, when the first data frames are transmitted by using the simultaneous multi-link aggregation transmission, synchronous transmission of the first data frames sent by respective transmission links can be achieved. The sending time and the receiving time when transmitting the first data frames in respective transmission links can be consistent.

Figure 5:
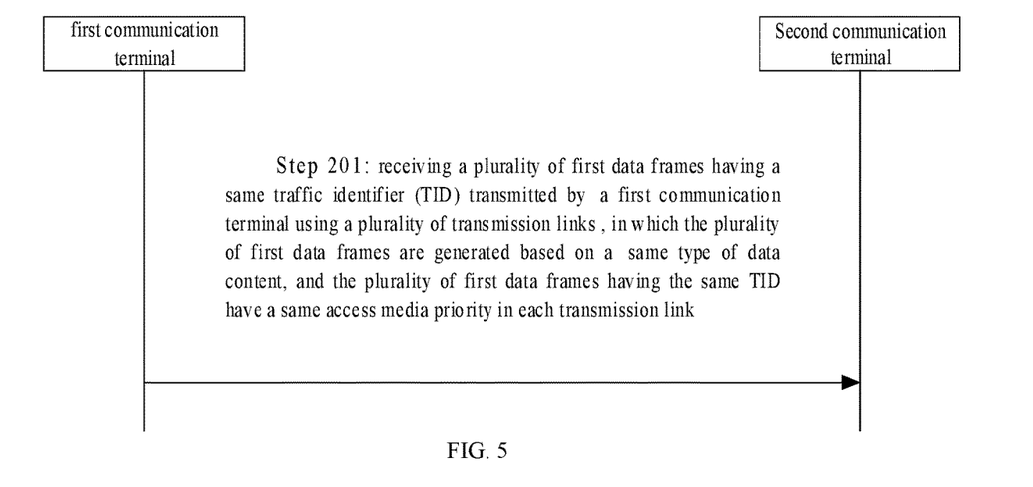
FIG. 5 is a flowchart of another method for transmitting data according to an exemplary embodiment.

As illustrated in FIG. 5, this exemplary embodiment provides a method for transmitting data, which can be applied to the second communication terminal of wireless communication. The method includes the following steps.

In step 201, a plurality of first data frames having a same traffic identifier (TID) transmitted by a first communication terminal using a plurality of transmission links are received, in which the plurality of first data frames are generated based on a same type of data content, and the plurality of first data frames having the same TID have a same access media priority in each transmission link.

Here, wireless communication may be Wi-Fi communication under the IEEE802.11be standard. The first communication terminal and the second communication terminal may be STA and AP in Wi-Fi communication. The first data frames may be data frames respectively transmitted in the plurality of transmission links. The first data frame may be MPDU or A-MPDU.

Here, each transmission link occupies one transmission band, and multiple transmission links occupy multiple transmission bands. The transmission band may be any Wi-Fi working band, such as 2.4 GHz, 5.8 GHz and 6-7 GHz, or a frequency range of the bandwidth occupied by the transmission band. The frequency ranges of the bandwidths occupied by the transmission bands may belong to the same Wi-Fi working band, or may belong to different Wi-Fi working bands. There may be a plurality of first data frames, and the plurality of first data frames may be transmitted respectively in the plurality of transmission links. The plurality of first data frames may include two or more data frames.

The first communication terminal such as the STA encapsulates the data content of the upper layer into a data frame according to a certain frame structure at the MAC layer, and then sends the data frame through the PHY after being processed by the PLCP sublayer.

Here, the same type of data content may be data content having the same type. For example, data content with high real-time transmission requirement can be classified into one type, and data content with high reliability requirement can be classified into one type. The same TID may be set for the first data frames generated based on the data content of the same type.

The type corresponding to the data content may include: speech data, video data or other data types. Other data types may include, but not limited to URLLC service data.

Data content Wi-Fi multimedia defines multiple access media priority queues for data frames of different data content types of upper-layer data. The access media priority may include: speech priority, video priority, best effort priority, and back ground priority. Different data content types have different access media priorities. The access media priority of the data content with high real-time transmission requirement may be the speech priority, and the access media priority of the data content with a large data amount may be the video priority, the access media priority of the data content with high reliability requirement may be the best effort priority, and the access media priority of the data content with ordinary transmission requirement may be the back ground priority. The data frames are transmitted in a queue according to the access media priorities of the data frames. For example, the data frames having the high access media priority are transmitted first.

Here, when the upper layer data is encapsulated into a data frame at the MAC layer, a TID can be set in the data frame. Data frames of the same data content type can be set with the same TID, and data frames of different data content types have different TIDs. Different TIDs can be configured to represent different access media priorities. Therefore, data frames of the same data content type have the same access media priority.

TID may be set at a preset position of a MAC frame header, for example, TID may be set at a reserved bit of the MAC frame header. TID can occupy 3 bits, and different values are configured to represent different TIDs, and to further represent different access media priorities.

When the first communication terminal transmits the first data frames, it may read the TIDs of the first data frames first, and then determine the access media priorities of the first data frames. The first data frames may be placed into an access media priority transmission queue for transmission. The first communication terminal may transmit the data frames according to the corresponding access media priorities of respective transmission queues from high to low.

The first data frame may be transmitted by the first communication terminal through multiple transmission links and received by the second communication terminal. The second communication terminal may be a STA or an AP in Wi-Fi communication. The frequency band coverage ranges of multiple transmission links are different, and the multiple transmission links can transmit data frames at the same time, thereby increasing the transmission rate of data frames and improving the transmission efficiency of data frames.

In this way, the first data frames based on the same type of data content have the same TID, and further, when the first data frames based on the same type of data content are transmitted in multiple transmission links, the first data frames have the same access media priority. Therefore, when each transmission link transmits the first data frames of the same access media priority, the expected QoS can be satisfied, and actual QoS instability for different types of data content is reduced. Moreover, the transmission efficiency is improved by using multiple transmission links.

In an embodiment, receiving the plurality of first data frames having the same TID transmitted by the first communication terminal using the plurality of transmission links includes:

receiving the first data frame using a second transmission link in the plurality of transmission links, in which the first data frame is preconfigured to be transmitted using a first transmission link in the plurality of transmission links.

The frequency band of the first transmission link is different from the frequency band of the second transmission link.

The frequency band of the first transmission link is different from the frequency band of the second transmission link.

Different transmission links have different traffic loads. When the first communication terminal transmits the first data frame through one transmission link in the multiple transmission links, if a traffic status of the transmission link no longer meets transmission requirements of the first data frame, the first data frame can be transferred to another transmission link in the plurality of transmission links for transmission. When the first data frame is transferred to another transmission link, the TID remains unchanged.

The transmission link switching condition may be preset. The transmission link switching condition may be set according to the traffic status of the first transmission link. For example, when the first transmission link is disturbed by external interference, the first data frame may be transferred from the first transmission link to the second transmission link for transmission.

The transmission link of the first data frame may be switched by a MAC MLLE, and the TID of the first data frame in the first transmission link may be maintained.

In this way, when the transmission link is switched for the first data frame, the transmission link after switching can be selected based on the access media priority, thereby reducing actual QoS instability of data content of the same type caused since the transmission link after switching does not have the access media priority of the first data frame.

In an embodiment, before receiving the first data frame using the second transmission link in the plurality of transmission links, the method further includes:

receiving a second data frame transmitted using the first transmission link.

The second data frame includes frequency band information configured to indicate a frequency band of the second transmission link.

Here, the second data frame is a data frame transmitted before the first data frame. The first data frame and the second data frame may be data frames generated based on the same type of data content. The second data frame carries the frequency band information, which is configured to instruct the second communication terminal to use the second transmission link to receive subsequent data frames after the second data frame. After receiving the second data frame carrying the frequency band information, the second communication terminal determines the frequency band of the second transmission link according to the frequency band information, and receives data frames transmitted after the second data frame using the second transmission link.

The frequency band information carried in the second data frame transmitted before the first data frame instructs the second communication terminal to switch to the second transmission link for receiving the data frame. In this way, the user device can be informed in advance that it needs to switch to the second transmission link for receiving the data frame, thereby reducing data frame reception failures caused when the user device does not switch to the second transmission link or does not switch to the second transmission link in time. In an embodiment, the frequency band information is located at a first preset position in the QoS field of the MAC frame header of the second data frame.

A preset position may be set in the QoS field of the MAC frame header of the MAC layer data frame shown in FIG. 2.

As illustrated in FIG. 3, the frequency band information can be set in the HT control middle subfield.

For example, as illustrated in FIG. 4, the frequency band information can be set using reserved bits B25 to B284 in the HT control middle subfield. For example, two bits may be configured to identify the frequency band to be switched to, that is, the frequency band information of the second transmission link.

In an embodiment, before receiving the data frames using the second transmission link, the method further includes:
transmitting a management frame or a third data frame to the first communication terminal, in which the management frame or the third data frame transmitted to the first communication terminal carries multi-transmission link switching capability information.

The multi-transmission link switching capability information is configured to indicate whether the second communication terminal has a capability of switching the transmission link to transmit the data frames.

The third data frame or the management frame transmitted by the second communication terminal is received. The third data frame or management frame carries the multi-transmission link switching capability information.

In response to transmission link switching conditions being satisfied, stopping transmitting the first data frame using the first transmission link in the pre-configured plurality of transmission links, and transmitting the first data frame using the second transmission link in the plurality of transmission links, includes:
in response to the multi-transmission link switching capability information indicating that the second communication terminal has a capability of switching the transmission link to transmit data frames, and in response to the transmission link switching condition being satisfied, stopping transmitting the first data frame using the first transmission link in the pre-configured plurality of transmission links and transmitting the first data frame using the second transmission link in the plurality of transmission links.

Before the first communication terminal and the second communication terminal perform data transmission using multiple transmission links, the first communication terminal and the second communication terminal can determine based on multi-transmission link switching capability information carried in management frame or data frame, whether the other party has a capability of switching the transmission link to transmit data frames. After it is determined that the other party has the capability of switching the transmission link to transmit data frames, multi-link transmission can be performed and/or switching the transmission link can be performed for transmitting data frames.

For example, when the first communication terminal determines based on the multi-transmission link switching capability information that the second communication terminal does not have the ability of switching the transmission link to transmit data frames, if the transmission link switching condition is satisfied, the first communication terminal still transmits the first data frame using the first transmission link. When the first communication terminal determines that the second communication terminal has the capability of switching the transmission link to transmit the data frames, the first data frame may be switched to the second transmission link for transmission.

In detail, STA can carry the multi-transmission link switching capability information in the management frame such as a probe request frame, an association request frame, or an authentication request frame. AP can carry the multi-transmission link switching capability information in the management frame such as a beacon frame, a probe response frame, an association response frames, or an authentication response frame.

In an embodiment, the method further includes:
obtaining frame type identification information contained in the first data frame; and
combining and decoding the plurality of received first data frames in response to the frame type identification information indicating that the first data frame is an aggregated data frame transmitted using the plurality of transmission links.

Here, the frame type identification information may be carried in the first data frame. After receiving the first data frame, the second communication terminal determines the type of the first data frame according to the frame type identification information. If the first data frame is an aggregated data frame transmitted using the plurality of transmission links, the first data frame and aggregated data frames transmitted by a plurality of other transmission links may be combined and decoded.

In an embodiment, the frame type identification information is located at the second preset position in the QoS of the MAC frame header of the first data frame.

For example, as illustrated in FIG. 4, the frame type identification information can be set using two bits B20 and B21 in the HT control middle subfield of the HT field in the QoS field.

In an embodiment, the TID is located at a third preset position in the QoS field of the MAC header of the first data frame.

The TID may be set in the QoS field of the MAC frame header of the MAC layer data frame shown in FIG. 2. TID can occupy 3 bits.

In an embodiment, receiving the plurality of first data frames having the same TID transmitted by the first communication terminal using the plurality of transmission links includes at least one of:
receiving the plurality of first data frames having the same TID transmitted by the first communication terminal using independent multi-link aggregation transmission; and
receiving the plurality of first data frames having the same TID transmitted by the first communication terminal using simultaneous multi-link aggregation transmission.

The first data frames having the same TID are transmitted by using independent multi-link aggregation transmission.

The first data frames having the same TID are transmitted by using simultaneous multi-link aggregation transmission.

The transmission links include: the independent multi-link aggregation transmission shown in FIG. 6 and the simultaneous multi-link aggregation transmission shown in FIG. 7.

As illustrated in FIG. 6, when the first data frames are transmitted by using the independent multi-link aggregation transmission, the first data frames are transmitted independently by each transmission link, and the plurality of transmission links of the independent multi-link aggregation transmission can be determined according to their respective scheduling requirements in a time domain, without the need to maintain synchronization.

As illustrated in FIG. 7, when the first data frames are transmitted by using the simultaneous multi-link aggregation transmission, synchronous transmission of the first data frames sent by respective transmission links can be achieved. The sending time and the receiving time when transmitting the first data frames in respective transmission links can be consistent.

A specific example is provided below in combination with any of the above-mentioned embodiments.

1. Settings for Multi-Link Communication TID

The multi-link transmission performed by the device or the STA may include the independent multi-link aggregation transmission shown in FIG. 6 and the simultaneous multi-link aggregation transmission shown in FIG. 7.

The STA obtains the upper layer data and processes it at the MAC layer. Since the data contents obtained at the upper layer are the same, the data contents have the same access media priority in access transmission, and each data frame based on the upper layer data has the same TID. In detail, as illustrated in FIG. 2, the TID can be set in the QoS field in the MAC frame header of the data frame, and the TID can occupy 3 bits. In this way, the data frames based on the upper layer data have the same access media priority in each transmission link.

In order to identify the transmitted data frame as a multi-link aggregated data frame, as illustrated in FIG. 4, two reserved bits B20 and B21 in the HT control middle subfield can be configured to set the frame type identification information, and the frame type identification information can indicate that the data frame is a multi-link aggregated data frame. The HT control middle subfield is located in the HT of the QoS field.

2. Dynamic Switching of Multi-Link TID (1) Before performing data exchange, the device or the STA can carry the multi-transmission link switching capability information, that is, capability information value of multi-link TID switching, in the management frame. In detail, the STA can carry the information in a probe request frame, an association request frame or an authentication request frame, and an AP can carry the information in a beacon frame, a probe response frame, an association response frame or an authentication response frame.

(2) When the device or the STA transmits data in a transmission link, considering the traffic load in the transmission link, if the load in this transmission link is too high, a probability of communication congestion is high, which may lead to low communication quality. MAC MLLE can switch the transmitted data frames from one transmission link to another, and the data frames has the same TID before and after switching the transmission link.

As illustrated in FIG. 4, 4 bits occupied by B25 to B28 in the HT control middle subfield can be configured to identify link switching for transmitting the next data frame. In detail, two bits can be configured to identify the frequency band to be switched to.

Figure 8:
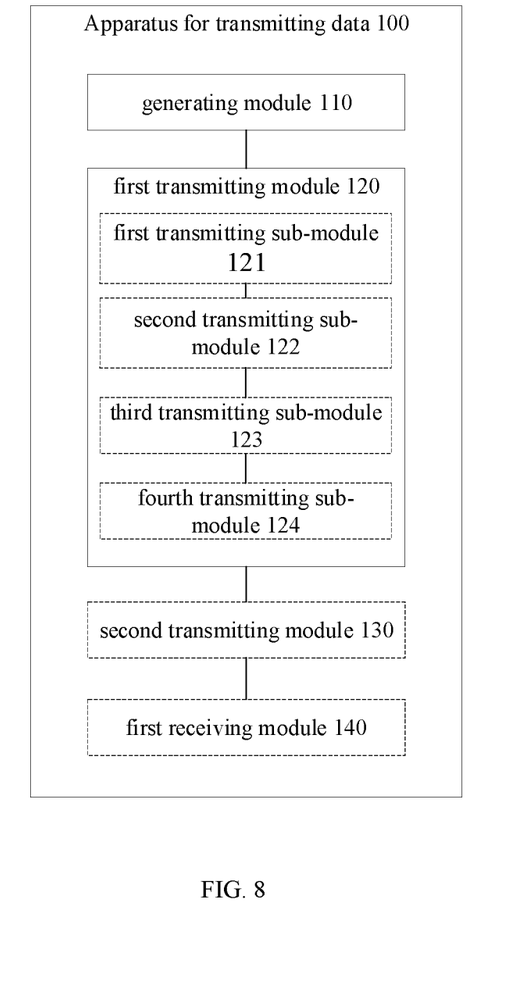
FIG. 8 is a block diagram of an apparatus for transmitting data according to an exemplary embodiment.

Embodiments of the disclosure further provide an apparatus for transmitting data, which is applied to a first communication terminal of wireless communication. As illustrated in FIG. 8, the apparatus for transmitting data 100 includes: a generating module 110 and a first transmitting module 120.

The generating module 110 is configured to generate a plurality of first data frames based on the same type of data content, in which the plurality of first data frames have the same TID, and the plurality of first data frames having the same TID have the same access media priority in a plurality of transmission links.

The first transmitting module 120 is configured to transmit the plurality of first data frames having the same TID using the plurality of transmission links.

In an embodiment, the first transmitting module 120 includes:
a first transmitting sub-module 121, configured to, in response to a transmission link switching condition being satisfied, stop transmitting the first data frame using a first transmission link in the pre-configured plurality of transmission links and transmit the first data frame using a second transmission link in the plurality of transmission links.

In an embodiment, the apparatus 100 further includes a second transmitting module 130. The second transmitting module 130 is configured to:
transmit a second data frame using the first transmission link before the first data frame is transmitted using the second transmission link in the plurality of transmission links.

The second data frame includes frequency band information configured to indicate a frequency band of the second transmission link.

In an embodiment, the frequency band information is located at a first preset position in a quality of service (QoS) field of a media access control (MAC) frame header of the second data frame.

In an embodiment, the transmission link switching condition includes one of:
a load of the first transmission link being greater than a load threshold; and
a communication quality of the first transmission link being less than a quality threshold.

In an embodiment, the apparatus 100 further includes: a first receiving module 140.

The first receiving module 140 is configured to receive a third data frame or a management frame transmitted by a second communication terminal before stopping transmitting the first data frame using the first transmission link in the pre-configured plurality of transmission links and transmitting the first data frame using the second transmission link in the plurality of transmission links in response to transmission link switching condition being satisfied, in which the third data frame or the management frame carries multi-transmission link switching capability information.

The first transmitting module 120 includes: a second transmitting sub-module 122.

The second transmitting sub-module 122 is configured to stop transmitting the first data frame using the first transmission link in the pre-configured plurality of transmission links and transmit the first data frame using the second transmission link in the plurality of transmission links in response to the multi-transmission link switching capability information indicating that the second communication terminal has a capability of switching the transmission link to transmit data frames, and in response to the transmission link switching condition being satisfied.

In an embodiment, the first data frame includes frame type identification information.

The frame type identification information is configured to indicate whether the first data frame is an aggregated data frame transmitted using the plurality of transmission links.

In an embodiment, the frame type identification information is located at a second preset position in a QoS of a MAC frame header of the first data frame.

In an embodiment, the TID is located at a third preset position in a QoS field of a MAC frame header of the first data frame.

In an embodiment, the first transmitting module 120 includes at least one of a third transmitting sub-module 123 and a fourth transmitting sub-module 124.

The third transmitting sub-module 123 is configured to transmit the plurality of first data frames having the same TID using independent multi-link aggregation transmission.

The fourth transmitting sub-module 124 is configured to transmit the plurality of first data frames having the same TID using simultaneous multi-link aggregation transmission.

Figure 9:
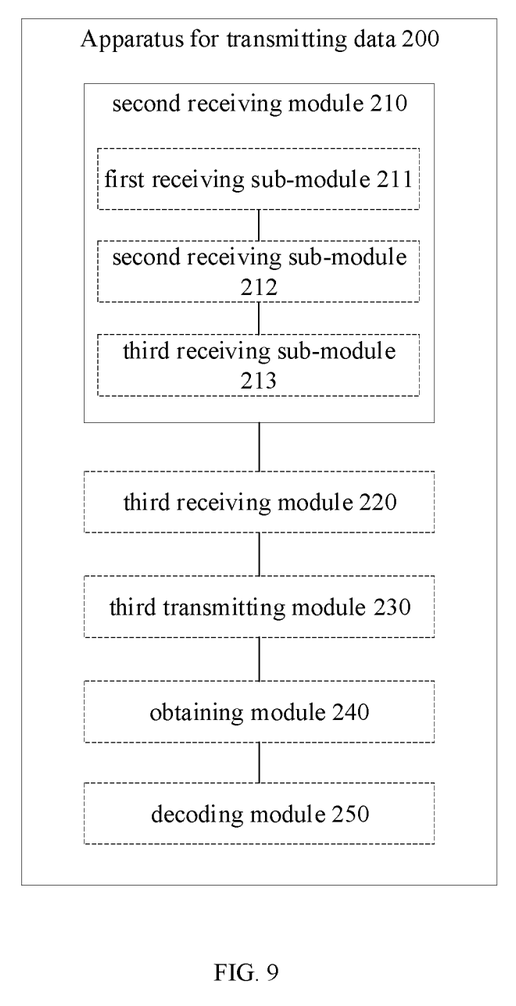
FIG. 9 is a block diagram of another apparatus for transmitting data according to an exemplary embodiment.

Embodiments of the disclosure further provide an apparatus for transmitting data, which is applied to a second communication terminal of wireless communication. As illustrated in FIG. 9, the apparatus for transmitting data 200 includes: a second receiving module 210.

The second receiving module 210 is configured to receive a plurality of first data frames having the same TID transmitted by a first communication terminal using a plurality of transmission links, in which the plurality of first data frames are generated based on the same type of data content, and the plurality of first data frames having the same TID have the same access media priority in each transmission link.

In an embodiment, the second receiving module 210 includes: a first receiving sub-module 211.

The first receiving sub-module 211 is configured to receive the first data frame using a second transmission link in the plurality of transmission links, in which the first data frame is preconfigured to be transmitted using a first transmission link in the plurality of transmission links.

In an embodiment, the apparatus 200 further includes: a third receiving module 220.

The third receiving module 220 is configured to receive a second data frame transmitted by the first transmission link before the first data frame is received using the second transmission link in the plurality of transmission links.

The second data frame includes frequency band information configured to indicate at least one frequency band of the second transmission link.

In an embodiment, the frequency band information is located at a first preset position in a QoS field of a MAC frame header of the second data frame.

In an embodiment, the apparatus 200 further includes: a third transmitting module 230.

The third transmitting module 230 is configured to transmit a management frame or a third data frame to the first communication terminal before the second transmission link receives data frames, in which the management frame or the third data frame transmitted to the first communication terminal carries multi-transmission link switching capability information.

The multi-transmission link switching capability information is configured to indicate whether the second communication terminal has a capability of switching the transmission link to transmit the data frames.

In an embodiment, the apparatus 200 further includes: an obtaining module 240 and a decoding module 250.

The obtaining module 240 is configured to obtain frame type identification information contained in the first data frame.

The decoding module 250 is configured to combine and decode the plurality of the received first data frames in response to the frame type identification information indicating that the first data frame is an aggregated data frame transmitted by the plurality of transmission links.

In an embodiment, the frame type identification information is located at a second preset position in a QoS of a MAC frame header of the first data frame.

In an embodiment, the TID is located at a third preset position in a QoS field of a MAC frame header of the first data frame.

In an embodiment, the receiving module 210 includes at least one of a second receiving sub-module 212 and a third receiving sub-module 213.

The second receiving sub-module 212 is configured to receive the plurality of first data frames having the same TID transmitted by the first communication terminal using independent multi-link aggregation transmission.

The third receiving sub-module 213 is configured to receive the plurality of first data frames having the same TID transmitted by the first communication terminal using simultaneous multi-link aggregation transmission.

In an exemplary embodiment, the generating module 110, the first transmitting module 120, the second transmitting module 130, the first receiving module 140, the second receiving module 210, the third receiving module 220, the third transmitting module 230, the obtaining module 240 and the decoding module 250 can be implemented by one or more central processing units (CPUs), graphics processing units (GPUs), baseband processors (BPs), application specific integrated circuits (ASICs), DSPs, programmable logic devices (PLDs), complex programmable logic devices (CPLDs), field-programmable gate arrays (FPGAs), general processors, controllers, micro controller units (MCUs), microprocessors, or other electronic components, to implement the above method.

Figure 10:
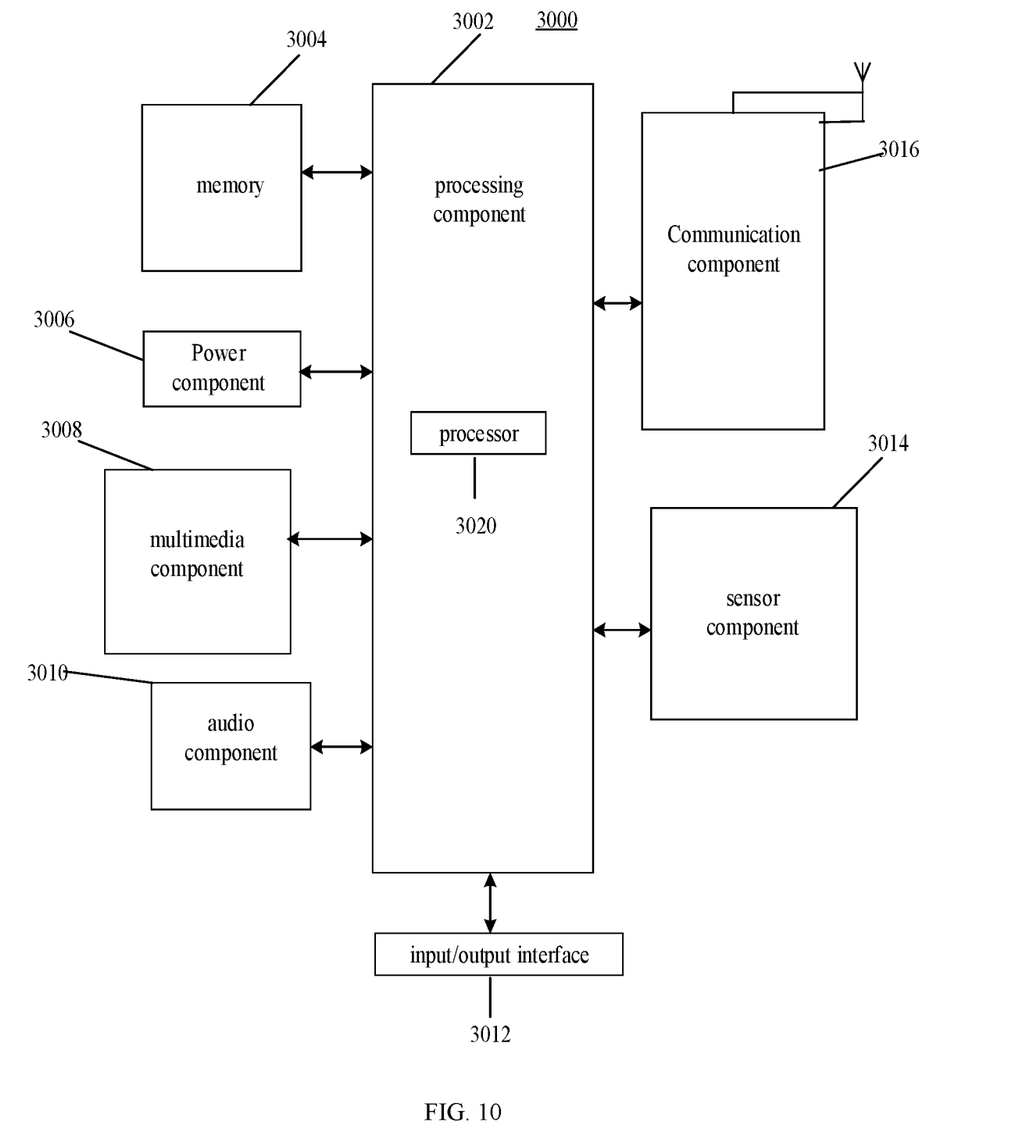
FIG. 10 is a block diagram of an apparatus for transmitting data according to an exemplary embodiment.

FIG. 10 is a schematic diagram of an apparatus for transmitting data 3000 according to an exemplary embodiment. For example, the apparatus 3000 may be a mobile phone, a computer, a digital broadcasting terminal, a message transceiver device, a game console, a tablet device, a medical device, a fitness device and a personal digital assistant.

Referring to FIG. 10, the apparatus 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the apparatus 3000, such as the operations associated with display, telephone calls, data communications, camera operations, and recording operations. The processing component 3002 may include one or more processors 3020 to execute instructions to perform all or part of the steps in the above described method. Moreover, the processing component 3002 may include one or more modules which facilitate the interaction between the processing component 3002 and other components. For instance, the processing component 3002 may include a multimedia module to facilitate the interaction between the multimedia component 3008 and the processing component 3002.

The memory 3004 is configured to store various types of data to support the operation of the apparatus 3000. Examples of such data include instructions for any applications or methods operated on the apparatus 3000, contact data, phonebook data, messages, pictures, video, etc. The memory 3004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3006 provides power to various components of the apparatus 3000. The power component 3006 may include a power management system, one or more power sources, and any other components associated with the generation, management, and distribution of power in the apparatus 3000.

The multimedia component 3008 includes a screen providing an output interface between the apparatus 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3008 includes a front-facing camera and/or a rear-facing camera. When the apparatus 3000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 3010 is configured to output and/or input audio signals. For example, the audio component 3010 includes a microphone (MIC) configured to receive an external audio signal when the apparatus 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as a keyboard, a click wheel, buttons, and the like. The buttons may include, but are not limited to, a home button, a volume button, a starting button, and a locking button.

The sensor component 3014 includes one or more sensors to provide status assessments of various aspects of the apparatus 3000. For instance, the sensor component 3014 may detect an open/closed status of the apparatus 3000, relative positioning of components, e.g., the display and the keypad, of the apparatus 3000, a change in position of the apparatus 3000 or a component of the apparatus 3000, a presence or absence of user contact with the apparatus 3000, an orientation or an acceleration/deceleration of the apparatus 3000, and a change in temperature of the apparatus 3000. The sensor component 3014 may include a proximity sensor configured to detect the presence of nearby objects without any physical contact. The sensor component 3014 may also include a light sensor, such as a CMOS or CCD image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the apparatus 3000 and other devices. The apparatus 3000 can access a wireless network based on a communication standard, such as WiFi, 2G, or 3G, or a combination thereof. In an exemplary embodiment, the communication component 3016 receives a broadcast signal or broadcast associated information from an external broadcast management system via a broadcast channel. In an exemplary embodiment, the communication component 3016 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the apparatus 3000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 3004, executable by the processor 3020 in the apparatus 3000, for performing the above method. For example, non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for transmitting data, performed by a first communication terminal, comprising:
    generating a plurality of first data frames based on a same type of data content, wherein the plurality of first data frames have a same traffic identifier (TID), and the plurality of first data frames having the same TID have a same access media priority in a plurality of transmission links; and
    transmitting the plurality of first data frames having the same TID using the plurality of transmission links.

2. The method of claim 1, wherein transmitting the plurality of first data frames having the same TID using the plurality of transmission links comprises:
    in response to a transmission link switching condition being satisfied, stopping transmitting the first data frame using a first transmission link in the plurality of transmission links, and transmitting the first data frame using a second transmission link in the plurality of transmission links.

3. The method of claim 2, wherein before transmitting the first data frame using the second transmission link in the plurality of transmission links, the method further comprises:
    transmitting a second data frame using the first transmission link; wherein
    the second data frame comprises frequency band information configured to indicate a frequency band of the second transmission link.

4. The method of claim 3, wherein the frequency band information is located at a first preset position in a quality of service (QOS) field of a media access control (MAC) frame header of the second data frame.

5. The method of claim 2, wherein the transmission link switching condition being satisfied comprises one of:
a load of the first transmission link being greater than a load threshold; and
a communication quality of the first transmission link being less than a quality threshold.

6. The method of claim 2, wherein before in response to the transmission link switching condition being satisfied, stopping transmitting the first data frame using the first transmission link in the plurality of transmission links, and transmitting the first data frame using the second transmission link in the plurality of transmission links, the method further comprises:
receiving a third data frame or a management frame transmitted by a second communication terminal, wherein the third data frame or the management frame carries multi-transmission link switching capability information;
in response to the transmission link switching condition being satisfied, stopping transmitting the first data frame using the first transmission link in the plurality of transmission links, and transmitting the first data frame using the second transmission link in the plurality of transmission links, comprises:
in response to the multi-transmission link switching capability information indicating that the second communication terminal has a capability of switching the transmission link to transmit data frames, and in response to the transmission link switching condition being satisfied, stopping transmitting the first data frame using the first transmission link in the plurality of transmission links, and transmitting the first data frame using the second transmission link in the plurality of transmission links.

7. The method of claim 1, wherein
the first data frame further comprises frame type identification information;
the frame type identification information is configured to indicate whether the first data frame is an aggregated data frame transmitted using the plurality of transmission links.

8. The method of claim 7, wherein the frame type identification information is located at a second preset position in a QoS field of a MAC frame header of the first data frame.

9. The method of claim 1, wherein the TID is located at a third preset position in a QoS field of a MAC frame header of the first data frame.

10. The method of claim 1, wherein transmitting the plurality of first data frames having the same TID using the plurality of transmission links comprises at least one of:
transmitting the plurality of first data frames having the same TID using independent multi-link aggregation transmission; or
transmitting the plurality of first data frames having the same TID using simultaneous multi-link aggregation transmission.

11. A method for transmitting data, performed by a second communication terminal, comprising:
receiving a plurality of first data frames having a same traffic identifier (TID) transmitted by a first communication terminal using a plurality of transmission links, wherein the plurality of first data frames are generated based on a same type of data content, and the plurality of first data frames having the same TID have a same access media priority in each transmission link.

12. The method of claim 11, wherein receiving the plurality of first data frames having the same TID transmitted by the first communication terminal using the plurality of transmission links comprises:
receiving the first data frame using a second transmission link in the plurality of transmission links, wherein the first data frame is preconfigured to be transmitted using a first transmission link in the plurality of transmission links.

13. The method of claim 12, wherein before receiving the first data frame using the second transmission link in the plurality of transmission links, the method further comprises:
receiving a second data frame transmitted using the first transmission link; wherein
the second data frame comprises frequency band information configured to indicate a frequency band of the second transmission link.

14. The method of claim 13, wherein the frequency band information is located at a first preset position in a QoS field of a MAC frame header of the second data frame.

15. The method of claim 12, wherein before receiving the data frame using the second transmission link, the method further comprises:
transmitting a management frame or a third data frame to the first communication terminal, wherein the management frame or the third data frame transmitted to the first communication terminal carries multi-transmission link switching capability information;
wherein the multi-transmission link switching capability information is configured to indicate whether the second communication terminal has a capability of switching the transmission link to transmit the data frames.

16. The method of claim 11, further comprising:
obtaining frame type identification information contained in the first data frame; and
combining and decoding the plurality of received first data frames in response to the frame type identification information indicating that the first data frame is an aggregated data frame transmitted using the plurality of transmission links.

17. The method of claim 16, wherein the frame type identification information is located at a second preset position in a QoS of a MAC frame header of the first data frame.

18. The method of claim 11, wherein the TID is located at a third preset position in a QoS field of a MAC frame header of the first data frame.

19. A second communication terminal, configured to implement the method of claim 11, comprising a processor, a memory and executable programs stored in the memory and capable of being run by the processor, wherein when the processor runs the executable programs, the method is implemented.

20. A first communication terminal, comprising a processor, a memory and executable programs stored in the memory and capable of being run by the processor, wherein when the processor runs the executable programs, a method for transmitting data is implemented, the method comprising:
generating a plurality of first data frames based on a same type of data content, wherein the plurality of first data frames have a same traffic identifier (TID), and the plurality of first data frames having the same TID have a same access media priority in a plurality of transmission links; and transmitting the plurality of first data frames having the same TID using the plurality of transmission links.

* * * * *